(12) United States Patent
Ejzak et al.

(10) Patent No.: US 9,516,683 B2
(45) Date of Patent: Dec. 6, 2016

(54) SYSTEM, METHOD AND COMPUTER READABLE MEDIUM FOR BEARER ACTIVATION IN A CORE NETWORK FOR WIRELESS DEVICES

(75) Inventors: Richard Ejzak, Wheaton, IL (US); Bruno Landais, Pleumeur-Bodou (FR); Harish Viswanathan, Morristown, NJ (US); Deborah Barclay, Winfield, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 456 days.

(21) Appl. No.: 13/540,297

(22) Filed: Jul. 2, 2012

(65) Prior Publication Data
US 2014/0003357 A1 Jan. 2, 2014

(51) Int. Cl.
*H04W 4/00* (2009.01)
*H04W 76/02* (2009.01)

(52) U.S. Cl.
CPC ......... *H04W 76/021* (2013.01); *H04W 76/022* (2013.01)

(58) Field of Classification Search
CPC ....... H04W 72/04; H04W 88/08; H04W 76/00
USPC ................................ 370/329, 322, 328, 338
See application file for complete search history.

(56) References Cited

U.S. PATENT DOCUMENTS

| | | | | |
|---|---|---|---|---|
| 8,339,959 B1* | 12/2012 | Moisand | ............ | H04L 63/0236 370/235 |
| 2010/0039987 A1* | 2/2010 | Hegde | ................... | H04W 40/02 370/328 |
| 2010/0056147 A1* | 3/2010 | Sun et al. | .................. | 455/435.2 |
| 2010/0189076 A1* | 7/2010 | Kim | ..................... | H04W 36/385 370/331 |
| 2010/0202351 A1* | 8/2010 | Xi | ..................... | H04L 29/12188 370/328 |
| 2011/0047256 A1* | 2/2011 | Babu | ................. | H04L 29/12367 709/223 |
| 2011/0261750 A1* | 10/2011 | Fujito | ............... | H04W 36/0094 370/315 |
| 2012/0057496 A1* | 3/2012 | Jin | ........................ | H04W 68/00 370/252 |

(Continued)

OTHER PUBLICATIONS

Hinden, R. and Deering, S., "RFC 3513: IPv6 Adressing Architecture", The Internet Society, Apr. 2003.

(Continued)

*Primary Examiner* — Hassan Phillips
*Assistant Examiner* — Siren Wei
(74) *Attorney, Agent, or Firm* — Harness, Dickey & Pierce, P.L.C.

(57) ABSTRACT

The method includes storing a gateway tunnel identifier, a base station identifier and a base station tunnel identifier; receiving, by the base station, a service request message from a device; establishing, by the base station, a radio bearer between the base station and the device in response to the service request message; receiving, by the base station, one or more first uplink data packets from the device using the radio bearer; modifying, by the base station, the one or more first uplink data packets such that the one or more first uplink data packets include the gateway tunnel identifier, the base station identifier and the base station tunnel identifier; and sending, by the base station, the modified uplink data packet to a gateway.

21 Claims, 5 Drawing Sheets

(56) References Cited

U.S. PATENT DOCUMENTS

| | | | | |
|---|---|---|---|---|
| 2012/0063464 A1* | 3/2012 | Mehta | ............... | H04W 28/02 370/401 |
| 2012/0151030 A1* | 6/2012 | Guttman | ............... | H04L 45/24 709/223 |
| 2013/0142166 A1* | 6/2013 | Bogineni | ............... | H04W 8/02 370/331 |
| 2013/0322435 A1* | 12/2013 | Wood | ............... | H04L 49/90 370/389 |

OTHER PUBLICATIONS

Rekhter, Y. et al., "RFC 1918: Address Allocation for Private Internets", Feb. 1996.

"3GPP TS 29.281 V11.2.0: 3rd Generation Partnership Project; Technical Specification Group Core Network and Terminals; General Packet Radio System (GPRS) Tunneling Protocol User Plane (GTPv1-U) (Release 11)", 3GPP Organizational Partners, Valbonne, France, Mar. 2012.

"3GPP TS 23.401 V11.1.0: 3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP Organizational Partners, Valbonne, France, Mar. 2012.

"3GPP TS 23.401 V11.1.0: 3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP Organizational Partners, Valbonne, France, Jun. 22, 2012, pp. 119-121, XP050625398.

Ericsson et al: "Addressing concerns with Up optimizations for small data", 3GPP Draft; S2-132147 WAS1793 Up Optimizations V2, 3rd Generation Partnership Project (3GPP), Mobile Competence Centre ; 650, Route Des Lucioles ; F-06921 Sophia-Antipolis CEDEX; France val. SA WG2, No. Busan, South Korea; 20130527-20130531, May 29, 2013, XP050709206.

"3GPP TR 23.887 V0.10.0; 3rd Generation Partnership Project; Technical Specification Group Services and System Aspects; Machine-Type and other Mobile Data Applications Communications Enhancements (Release 12)", X,P 3GPP Standard; 3GPP TR 23.887, 3rd Generation Partnership Project (3GPP), Mobile Competence Centre ; 650, Route Des Lucioles ; F-06921 Sophia-Antipolis CEDEX ; France, val. SA WG2, No. V0.10.0, Jun. 11, 2013, pp. 1-134, XP050692565.

3GPP TS 23.401 V11.1.0: 3rd Generation Partnership Project; Technical Specification Group Services and System Aspects; General Packet Radio Service (GPRS) enhancements for Evolved Universal Terrestrial Radio Access Network (E-UTRAN) access (Release 11), 3GPP Organizational Partners, Valbonne, France, Jun. 22, 2012, pp. 119-121, XP050625398.

International Preliminary Report dated Jan. 15, 2015.

LTE 3 GPP, "3rd Generation Partnership Project; Technical Specification Group Services and System Aspects; Machine-Type and other Mobile Data Applications Communications Enhancements," 3GPP TR 23,887, vo.5.0. (Nov. 2012).

Alcatel-Lucent, "Optimization for UP data transmissions," SA WG2 Meeting #92, S2-122977 Jul. 13, 2009, Barcelona, Spain (revision of S2-12xxxx).

* cited by examiner

SYSTEM, METHOD AND COMPUTER READABLE MEDIUM FOR BEARER ACTIVATION IN A CORE NETWORK FOR WIRELESS DEVICES

BACKGROUND OF THE INVENTION

Embodiments relate to bearer activation (re-activation) in core networks for wireless devices.

The Enhanced Packet Core (EPC) network for 3rd Generation Partnership Project (3GPP) Long Term Evolution (LTE) supports devices requiring long term Internet Protocol (IP) addresses for reachability, access to multiple specialized networks (e.g., virtual private networks (VPN) to enterprise networks, and service specific networks for IP Multimedia Subsystem (IMS)), and quality of service (QoS) attributes including priority, delay, bandwidth and packet loss. However, a large set of devices exist in which many of these characteristics are not needed, where a high volume of transactions is expected, and where there is a need to improve the efficiency of the EPC to support these devices.

For example, the devices include machine type devices with limited functions (e.g., a telemetry device that periodically reports data wirelessly) and selective IP traffic offload (SIPTO) where generic internet applications use best effort transport to initiate frequent transactions with internet based servers. SIPTO would be sufficient to support a high percentage of today's internet traffic. Smart phones in particular use such applications.

Existing solutions involve the use of the same packet core network procedures as for normal data services for normal users and so are not optimized for low cost delivery of infrequent short transactions. For example, the existing solutions involve either excessive signaling when the devices wake up from time to time just to send a very small number of packets and/or require permanent allocation of resources in the EPC user plane (e.g., serving gateway and packet gateway).

SUMMARY OF THE INVENTION

With the proliferation of Machine Type Communications (MTC) and SIPTO devices, improving the efficiency of device re-activation (e.g., reduce the network resources needed to support device re-initiation of data transmission after a quiescent period) is desired. With the potential proliferation of many more MTC and SIPTO devices than subscriber devices, where each such device periodically comes out of a quiescent state to perform a small transaction (e.g., reporting temperature or ATM cash threshold), any improvement in the efficiency with which the network can support re-initiation of data transmission for such a device may have a significant impact on use of network resources.

One embodiment includes a base station including a memory and a processor configured to execute a method. The method includes storing a gateway tunnel identifier, a base station identifier and a base station tunnel identifier; receiving, by the base station, a service request message from a device; establishing, by the base station, a radio bearer between the base station and the device in response to the service request message; receiving, by the base station, one or more first uplink data packets from the device using the radio bearer; modifying, by the base station, the one or more first uplink data packets such that the one or more first uplink data packets include the gateway tunnel identifier, the base station identifier and the base station tunnel identifier; and sending, by the base station, the modified uplink data packet to a gateway.

Another embodiment includes a network control entity including a memory and a processor configured to execute a method. The method includes receiving a service request message from a device; determining a gateway tunnel identifier and a gateway destination address based on the service request message; and sending a message to a base station associated with the device, the message including the gateway tunnel identifier and the gateway destination address.

Another embodiment includes a gateway including a memory and a processor configured to execute a method. The method includes receiving a first uplink data packet including a tunnel identifier and a base station identifier; and activating a bearer using the tunnel identifier and the base station identifier without a network control entity signaling the gateway to re-activate the bearer in the gateway.

Another embodiment includes a method. The method includes receiving a second uplink data packet including an address for the device, a tunnel endpoint ID (TEID) for the device and a gateway destination IP address; and using the address for the device, the TEID for the device and the gateway destination IP address from the second uplink data packet to establish address translation bindings.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
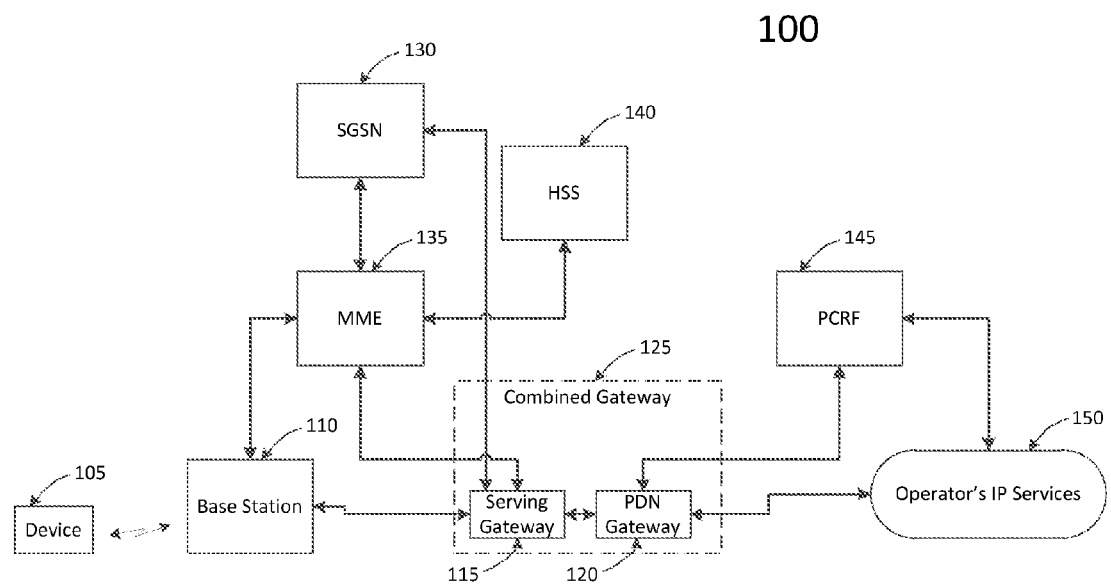
FIG. 1 illustrates a core network for wireless devices according to an example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

As used herein, the term "wireless device" or "device" may be considered synonymous to, and may hereafter be occasionally referred to, as a client, user equipment, mobile station, mobile user, mobile, subscriber, user, remote station, access terminal, receiver, mobile unit, etc., and may describe a remote user of wireless resources in a wireless communication network.

Similarly, as used herein, the term "base station" may be considered synonymous to, and may hereafter be occasionally referred to, as a Node B, evolved Node B, eNodeB, base transceiver station (BTS), RNC, etc., and may describe a transceiver in communication with and providing wireless resources to mobiles in a wireless communication network which may span multiple technology generations. As discussed herein, base stations may have all functionality associated with conventional, well-known base stations in addition to the capability to perform the methods discussed herein.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

A processor and a memory may operate together to run apparatus functionality. For example, the memory may store code segments regarding apparatus functions. The code segments may in-turn be executed by the processor. Further, the memory may store process variables and constants for use by the processor.

Example embodiments provide an efficient solution to carry infrequent transmission of short and sporadic user plane transactions between terminals and networks, for example, for Machine-to-machine (M2M) or more generally Machine Type Communications (MTC) mobile device or other low bandwidth data services. Example embodiments provide more generally an efficient solution to carry infrequent or frequent transmission of user plane data sent in bursts by applications that are then inactive for longer than the time used in the network to release the radio resources. For example, applications (or standalone devices) for which there will be, in aggregate, excessive signaling between the network and devices to establish and release radio resources to send potentially a small amount of data (e.g., for smartphone applications that send frequent small data such as known keep alives).

FIG. 1 illustrates a core network 100 for wireless devices according to an example embodiment. The core network 100 includes a base station (eNodeB) 110, a serving gateway 115, a packet data network (PDN) gateway 120, Serving General Packet Radio Service (GPRS) Support Node (SGSN) 130, a Mobility Management Entity (MME) 135, a Home Subscriber Server (HSS) 140 and a Policy Control and Charging Rules Function (PCRF) 145. Each of the base station 110, the serving gateway 115, the packet data network (PDN) gateway 120, the SGSN 130, the Mobility Management Entity (MME) 135, the Home Subscriber Server (HSS) 140 and the Policy Control and Charging Rules Function (PCRF) 145 include one or more processors and an associated memory operating together to run apparatus functionality.

The core network 100 communicates with one or more wireless devises 105 via base station 110. The core network 100 communicates with one or more operators IP services 150 via the PDN gateway 120 and the PCRF 145. The serving gateway 115 and the PDN gateway 120 may be combined into a single combined gateway 125.

The core network 100 may be an Evolved Packet Core (EPC) Network connected to an Evolved Universal Terrestrial Radio Access Network (E-UTRAN) or a Universal Terrestrial Radio Access Network (UTRAN). Long Term Evolution (LTE) is the name given to a project to improve the Universal Mobile Telecommunications System (UMTS) standard to cope with future requirements. In one aspect, UMTS has been modified to provide for the E-UTRAN as a fourth generation (4G) wireless network.

As is known, E-UTRAN may provide uplink (UL) and downlink (DL) channels for signaling and data transmissions. For example, a channel for Broadcast Control Channel (BCCH), Physical Uplink Control Channel (PUCCH), Physical Uplink Shared Channel (PUSCH), Physical Downlink Control Channel (PDCCH), Physical Downlink Shared Channel (PDSCH) and the like.

Generally, the base station (eNodeB) 110, the serving gateway 115, the packet data network (PDN) gateway 120, the Serving General Packet Radio Service (GPRS) Support Node (SGSN) 130, the Mobility Management Entity (MME) 135, the Home Subscriber Server (HSS) 140 and the Policy Control and Charging Rules Function (PCRF) 145 are known to those skilled in the art. Therefore, with the exception of the below example embodiments, the elements of FIG. 1 will not be described further for the sake of brevity.

According to an example embodiment, bearer activation may include storing, by a base station, a gateway tunnel identifier (identifying the tunnel at the gateway for user plane traffic sent from the base station towards the gateway), a base station tunnel identifier (identifying the tunnel at the base station for user plane traffic sent from the gateway towards the base station) and a base station identifier (e.g. identifying the IP address at which the base station expects to receive user plane traffic from the gateway); receiving, by the base station, a service request message from a device; establishing, by the base station, a radio bearer between the base station and the device in response to the service request message; receiving, by the base station, a first uplink data packet from the device using the radio bearer; modifying, by the base station, the first uplink data packet such that the first uplink data packet includes the gateway tunnel identifier, the base station tunnel identifier and the base station identifier; and sending, by the base station, the modified uplink data packet to a gateway.

Figure 2:
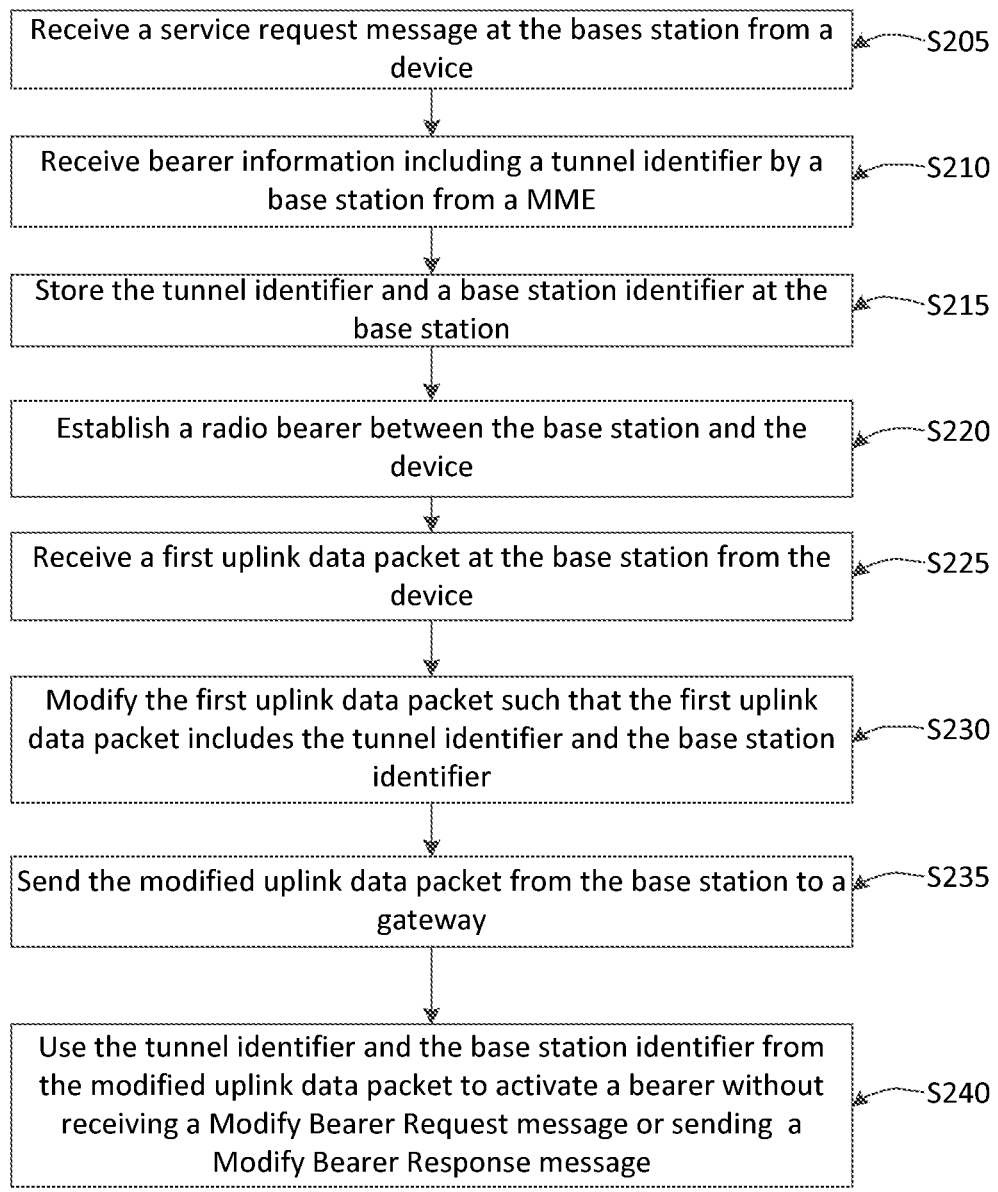
FIG. 2 illustrates another method for bearer activation in the core network for wireless devices according to an example embodiment.

FIG. 2 illustrates a method for bearer activation in the core network for wireless devices according to an example embodiment. While describing the steps of the method associated with FIG. 2, reference will be made to the core network 100 of FIG. 1 and the device 105 of FIG. 1.

In step S205 the base station 110 receives a service request message from the device 105. For example, the base station 110 may receive a non-access stratum (NAS) protocol message Service Request from the device 105 encapsulated in a radio resource control (RRC) protocol message to the eNodeB. NAS messages are known to those skilled in the art and are described in more detail in 3GPP TS 23.401.

In step S210 the base station 110 receives bearer information including a tunnel identifier (e.g., a gateway tunnel identifier) from the MME 135 (the MME 135 may also be known as network control entity). For example, the base station 110 may receive an S1-MME UE Initial Context Setup Request message from the MME 135. The message may include the serving gateway 115 address, gateway tunnel endpoint ID(s) (TEID) for the evolved packet system (EPS) bearers.

In step S215 the base station 110 stores the tunnel identifier (e.g., the gateway tunnel identifier) and allocates and stores a base station tunnel identifier and base station identifier (e.g., a base station IP address). For example, the base station 110 may include a memory system. The base station 110 may extract the information received in the message and store the information in the memory system.

In step S220 the base station 110 establishes a radio bearer between the base station 110 and the device 105. For example, in response to the Initial UE Context Setup Request message received from the MME 135, the base station 110 may establish a radio bearer. The base station 110 may perform the radio bearer establishment procedure described in more detail in 3GPP TS 23.401. When the radio bearers are setup, EPS bearer state synchronization is performed between the device and the network. However, the serving gateway 115 may need to acquire the base station identifier and base station tunnel identifier for sending downlink user plane towards the base station).

In step S225 the base station 110 receives a first uplink data packet from the device 105. For example, the base station 110 receives uplink data from the device via Uplink Shared Channel (PUSCH) associated with the radio bearer. The uplink data may include, for example, a temperature report or ATM cash threshold.

In step S230 the base station 110 modifies the first uplink data packet such that the first uplink data packet includes the gateway tunnel identifier, the base station tunnel identifier and the base station identifier. For example, the base station 110 may add the stored information to the first uplink data packet. As described above, the stored information may include the serving gateway 115 address, the TEID and the base station address. For example, the base station 110 may add a header to the first uplink data packet. The additional header may include the stored information including, at least, the base station address and the TEID.

In step S235 the base station 110 sends the modified uplink data packet to the serving gateway 115, or, alternatively the combined gateway 125. For example, the base station 110 sends the modified uplink data packet using any known standard. For example, the base station 110 sends the modified uplink data packet as described in more detail in 3GPP TS 23.401 and 3GPP TS 29.281 (GTP-U) e.g. using the new GTP-U extension header to carry the base station tunnel identifier and base station identifier.

In step S240 the serving gateway 115, or, alternatively the combined gateway 125 uses the gateway tunnel identifier and the base station identifier and tunnel identifier from the modified uplink data packet to activate a bearer without receiving a Modify Bearer Request message from, for example, the MME 135 or sending a Modify Bearer Response message to, for example, the MME 135. For example, by including the stored information in the modified uplink data packet, any signaling messages between the MME 135 and the serving gateway 115 (or, alternatively the combined gateway 125) described in more detail in 3GPP TS 23.401 are not necessary. For example, messages 8, 9, 11 and 12 (modify bearer request and response messages) described in the procedure of figure 5.3.4.1-1 of 3GPP TS 23.401 are not necessary.

Accordingly, the gateway (e.g., the serving gateway 115, the PDN gateway 120 or combined gateway 125) may receive a first uplink data packet including a tunnel identifier (e.g., TEID) and a base station identifier (e.g., base station 110 address) and the gateway may activate a bearer using the tunnel identifier and the base station identifier without receiving a Modify Bearer Request message or sending a Modify Bearer Response message.

Receipt of downlink user plane data from the serving gateway 115 by the base station 110 on the base station tunnel identifier may serve as an acknowledgement that the serving gateway 115 has received and stored the base station identifier and tunnel identifier. Subsequent uplink user plane data sent on this tunnel towards the serving gateway 115 may not include the base station identifier and tunnel identifier. The base station 110 may re-send dummy uplink user plane packets to the serving gateway 115 a limited number of times if the base station 115 does not receive a downlink packet from the serving gateway 115 acknowledging the receipt of the uplink user plane packets at the serving gateway 115.

Further, during handover procedures, the modify bearer request and response messages may also be removed. The MME 135 may not contact the serving gateway 115, or, alternatively the combined gateway 125, during handover. The purpose of these messages in known procedures is primarily to inform the serving gateway 115 of the target base station transport address and TEID for tunneled downlink data packets to be sent after handover. The target base station may perform this function by sending dummy (zero length user data payload) tunneled uplink data packet(s) to the serving gateway 115, or, alternatively the combined gateway 125, with a tunnel header formed as described above for the first uplink data after a service request, until acknowledged by a downlink data packet.

Figure 3:
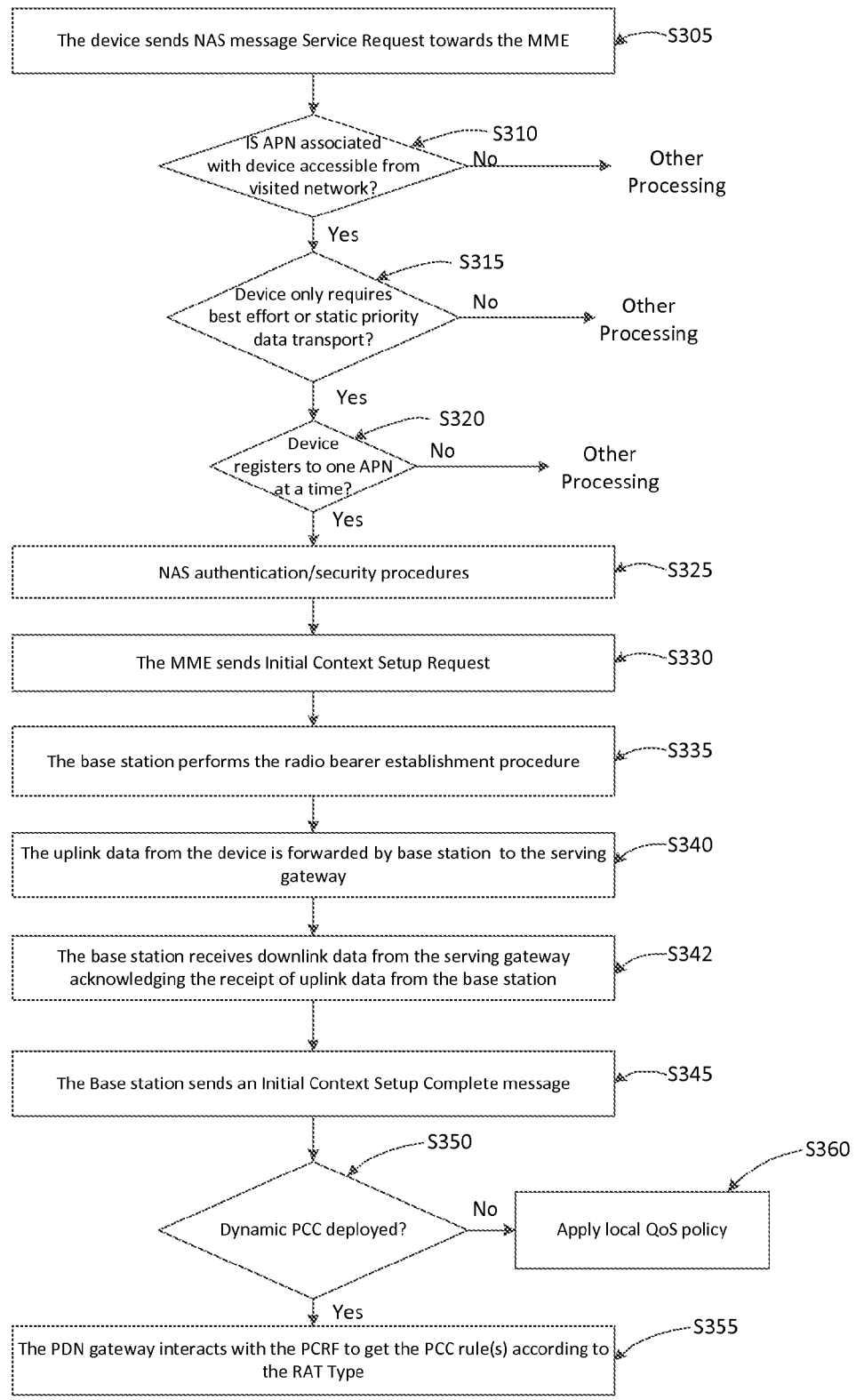
FIG. 3 illustrates another method for bearer activation in the core network for wireless devices according to an example embodiment.

FIG. 3 illustrates another method for bearer activation in the core network for wireless devices according to an example embodiment. While describing the steps of the method associated with FIG. 3, reference will be made to the core network 100 of FIG. 1 and the device 105 of FIG. 1.

In step S305 the device 105 sends a service request message (e.g., a NAS message Service Request) towards the MME 135. For example, the device 105 sends NAS message Service Request towards the MME 135 encapsulated in an RRC message to the base station 110. The base station 110 forwards NAS message to the MME 135. For example, the NAS message may be encapsulated in an E-UTRAN radio network layer signaling protocol (S1-AP). Further detail of this process may be described in, for example, 3GPP TS 23.401.

In step S310 the MME 135 determines if the access point network (APN) designating the packet data network to which the device 105 requests to be connected is accessible from the visited network. For example, the MME 135 may make this determination based on local configuration or information received from the HSS 140.

In step S315 the MME 135 determines if the device 105 requires best effort or static priority data transport. For example, the MME 135 may determine if the device 105 requires best effort or static priority data transport based on an indication received in the Service Request message or derived from the PDN connection previously setup by the device.

In step S320 the MME 135 determines if the device 105 has registered to only one APN at a time. For example, the MME 135 may determine if the device 105 has registered to only one APN at a time based on the knowledge of the PDN connections already established by the UE.

In step S325 authentication/security procedures (e.g., NAS authentication/security procedures) are initiated between the device 105 and the HSS 140. For example, NAS authentication/security procedures as defined in 3GPP TS 23.401 may be performed. For example, authentication and key agreement procedures, user identity and user data and signaling confidentiality, AS security mode command, NAS security mode command and ME identity check procedures may be performed.

In step S330 the MME 135 sends a setup request message to the base station 110. The message may include the base station address, tunnel endpoint ID(s) (TEID) for the evolved packet system (EPS) bearers, delay downlink packet notification request information, a Radio Access Technology (RAT) type indication and device location information. In addition, the set up request may include information as defined in 3GPP TS 23.401. For example, the MME may send S1-AP Initial Context Setup Request message. The message may include a serving gateway (e.g., serving gateway 115) address, S1-TEID(s) (UL), EPS Bearer QoS(s), Security Context, MME Signaling Connection Id, Handover Restriction List, closed subscriber group (CSG) Membership Indication. If there is a Packet Data Network (PDN) connection established for Local IP Access, the message may include a Correlation ID for enabling the direct user plane path between a home base station (HeNB) and a Local-Gateway (L-GW). This step may activate the radio and interface bearers for all the active EPS Bearers. The base station 110 may store some or all of the information included in the setup request message.

In step S335 the base station 110 performs a radio bearer establishment procedure between the base station 110 and the device 105. For example, in response to the service request message received from the device 105 and the setup request from the MME 135, the base station 110 may establish a radio bearer. The base station 110 may perform the radio bearer establishment procedure described in more detail in 3GPP TS 23.401. When the radio bearers are setup, EPS bearer state synchronization is performed between the device and the network.

In step S340 the device 105 sends uplink data via the base station 110 and the serving gateway 115 to PDN gateway 120. For example, the base station 110 receives a first uplink data packet from the device 105. For example, the base station 110 receives uplink data from the device via Uplink Shared Channel (PUSCH) associated with the radio bearer. The uplink data may include, for example, a temperature report or ATM cash threshold.

The base station 110 may modify the first uplink data packet such that the first uplink data packet includes the tunnel identifier and the base station identifier. For example, the base station 110 may add the stored information to the first uplink data packet. As described above, the stored information may include the base station address and the TEID. For example, the base station 110 may add a header to the first uplink data packet. The additional header may include the stored information including, at least, the base station address and the TEID.

The base station 110 sends the modified uplink data packet to the serving gateway 115, or, alternatively the combined gateway 125. For example, the base station 110 sends the modified uplink data packet using any known standard. For example, the base station 110 sends the modified uplink data packet as described in more detail in 3GPP TS 23.401.

In step S342 the base station 110 receives downlink data from the serving gateway 115. The downlink data confirms (acknowledges) the receipt of the uplink data from the base station 110 and serve as an acknowledgement that the serving gateway 115 has received and stored the base station identifier and tunnel identifier.

In step S345 the base station 110 sends a setup complete message (e.g., a S1-AP message Initial Context Setup Complete) to the MME 135. For example, a setup complete message as defined in 3GPP TS 23.401 may be sent by the MME 135 to the base station 110. For example, the base station 110 sends an S1-AP message Initial Context Setup Complete (eNodeB address, List of accepted EPS bearers, List of rejected EPS bearers, S1 TEID(s) (DL)) to the MME. The base station 110 may use the included information to establish a direct user plane path to the L-GW and forward uplink data for Local IP Access accordingly.

In step S350 the PDN gateway 120 determines if dynamic Policy and Charging Control (PCC) is deployed. If dynamic PCC is deployed, in step S355 the PDN gateway 120 interacts with the PCRF 145 to get the PCC rule(s) base on a Radio Access Technology (RAT) type. Otherwise, in step S360 the PDN gateway 120 applies a local QoS policy as described in more detail in 3GPP TS 23.401.

The example embodiment according to the method described in FIG. 3 may reduce the number of network messages needed when a device re-activates a bearer using the service request procedure, thus reducing the associated processor load on the MME 135 and the serving gateway 115, or, alternatively the combined gateway 125. With one data bearer for the device for an APN accessible from the visited network, it is possible to co-locate the serving gateway 115 and packet gateway 120, and to reduce the number of messages required in the "UE triggered service request" procedure described in clause 5.3.4.1 of 3GPP TS 23.401. If the determinations of steps S305, 310 and 315 are true, example embodiments may remove messages 8, 9, 11 and 12 (modify bearer request and response messages) from the procedure in figure 5.3.4.1-1 of 3GPP TS 23.401 and add the information missing from these messages to the first uplink data packets.

The modify bearer request message (message 9 in clause 5.3.4.1 of 3GPP TS 23.401) normally includes information about each bearer to be reactivated for the device 105 and the base station 110 TEID for each bearer. The bearer is identified implicitly by the tunnel endpoint identifier to which the packet is sent from the base station 110 to the serving gateway 115, or, alternatively the combined gateway 125, so only the base station transport address and TEID may be included in the first uplink data packets.

The receipt of the message at the serving gateway 115, or, alternatively the combined gateway 125 may be acknowledged with the receipt of the first downlink packet at the base station 110 (which may be a dummy downlink data packet with zero content used just for the purpose of acknowledgment). The extra information may not be included in the headers of subsequent uplink packets. For example, receipt of downlink user plane data from the serving gateway 115 by the base station 110 on the base station tunnel identifier may serve as an acknowledgement that the serving gateway 115 has received and stored the base station identifier and tunnel identifier. Subsequent uplink user plane data sent on this tunnel towards the serving gateway 115 may not include the base station identifier and tunnel identifier. The base station 110 may re-send dummy uplink user plane packets to the serving gateway 115 a limited number of times if the base station 115 does not receive a downlink packet from the serving gateway 115 acknowledging the receipt of the uplink user plane packets at the serving gateway 115.

Figure 4:
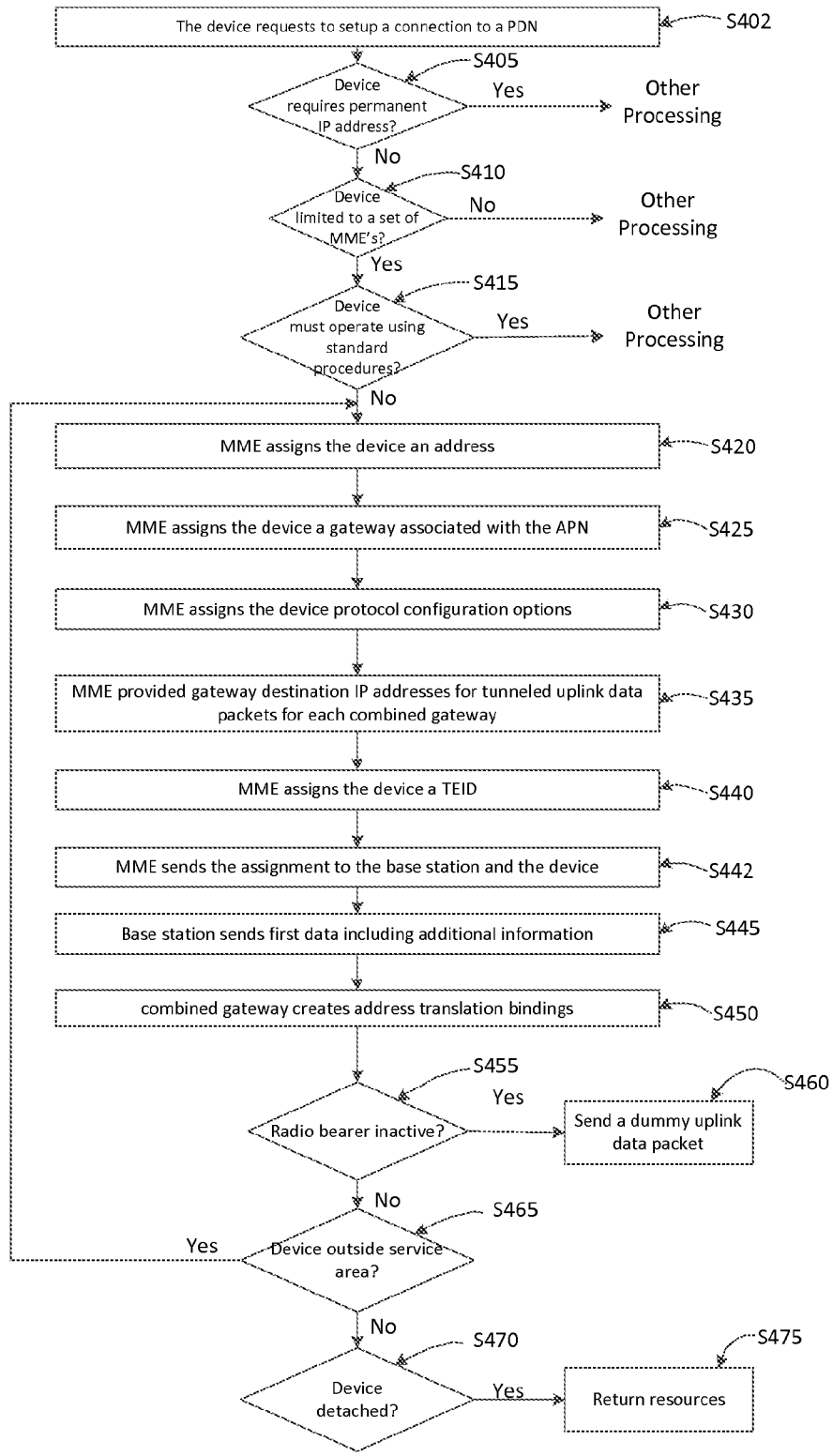
FIG. 4 illustrates another method for bearer activation in the core network for wireless devices according to an example embodiment.

FIG. 4 illustrates another method for bearer activation in the core network for wireless devices according to an example embodiment. While describing the steps of the method associated with FIG. 4, reference will be made to the core network 100 of FIG. 1 and the device 105 of FIG. 1.

In step S402 the device 105 requests to setup a connection to a PDN. For example, the device 105 may send a signalling message to the MME 135 via the base station 110. The message may include the request to setup a connection to a PDN.

In step S405 the MME 135 determines if the device 105 requires a permanent IP address. For example, the MME 135 may determine if the device 105 requires a permanent IP address based on subscription information received from the HSS or based upon the APN requested by the device 105.

In step S410 the MME 135 determines if seamless mobility for the device 105 can be limited to a set of MME's. For example, the MME 135 may determine if seamless mobility for the device 105 can be limited to a set of MME's based on subscription information or the requested APN.

In step S415 the MME 135 determines if the device 105 must operate using standard procedures. For example, the device 105 is not in a system in which the methods described in the example embodiments are available or if the device 105 needs to establish connectivity to more than one APN at a time, is it acceptable for the network to provide APN service to the device using existing standard procedures. For example, the MME 135 may determine if the device 105 can operate using standard procedures based on subscription information or the requested APN.

Steps S405 to steps S415 may be associated with an initial device attach procedure which may be a precursor to a bearer activation procedure.

In step S420 the MME 135 assigns the device 105 an address. For example, if an access point network (APN) (not shown) associated with the device 105 is an IPv4 APN, the MME may assign the device a private IPv4 address as defined in, for example, RFC 1918. The private IPv4 address may be unique within each service area defined for the APN, where the service area is within the scope of one or more MMEs. Address assignments may be unique across MMEs by assigning non-overlapping ranges of addresses to each MME (e.g., MME 135) for assignment. As a result the combined gateway 125 does not need to store the IP address assigned to the device for the lifetime of the data attachment.

Alternatively, if an access point network (APN) (not shown) associated with the device 105 is an IPv6 APN, the MME 135 assigns the device an IP address of one of the following types depending on the APN (where the address is unique at least within the current service area of the APN, which includes the area covered by one or more MMEs). The assigned address is either an IPv4 private address as defined in RFC 1918; an IPv6 global unicast address, where the prefix (or suffix) is assigned uniquely to each device and the device may use one or more interface IDs; an IPv6 site-local unicast address as defined in RFC 3513, where the interface ID is assigned uniquely to each device and the subnet ID is unique to each service area in which the device can remain continuously attached; or an IPv6 link-local unicast address as defined in RFC 3513, where the interface ID is assigned exactly as for the site-local address option, and the subnet ID is zero.

Address assignments may be made unique across MMEs by assigning non-overlapping ranges of addresses (or interface IDs, or prefixes, depending on the format chosen) to each MME for assignment. As a result the combined gateway 125 does not store the IP address assigned to the device for the lifetime of the data attachment.

The MME 135 allocates the address for the device 105 without signalling interaction with the gateway, such that the gateway does not store any permanent context information for packet data network connections established by the device. For example, the MME 135 allocates the IP address to the device 105 without signalling interaction with the combined gateway 125, in other words, without the existing PDN connection establishment signalling (e.g. GTP Create Session Request procedure over S11/S4 and S5/S8 interfaces—see 3GPP TS 23.401) which results in network signalling savings. Therefore, the combined gateway 125 may not store any permanent context information for PDN connections established by the device 105. As a result, the combined gateway 125 is a stateless gateway that only stores a context for devices actively involved in user plane data transfers.

In step S425 the MME 135 assigns the device a gateway associated with the APN. For example, the MME 135 assigns a combined gateway (e.g., combined gateway 125) associated with the APN to the device 105. This may eliminate message requirements between the MME 135 and the combined gateway 125. For example, messages between MME and the combined gateway as described in figure 5.3.2.1-1 in 3GPP TS 23.401 may be eliminated.

The MME 135 is provisioned with any information the MME 135 may require about the combined gateway 125 (e.g., gateway IP address for uplink user plane traffic to be sent from base station to the gateway) and APN (e.g., associated protocol configuration options to be communicated to the device) locally so that the MME 135 does not need to contact the combined gateway 125 for device specific procedures. The MME 135 also may ensure that the combined gateway 125 is available and that the locally provided information about the combined gateway 125 is current. As a result, no state information about the device 105 is stored in the combined gateway 125.

In step S430 the MME 135 assigns the device 105 one or more protocol configuration options. For example, the MME 135 assigns protocol configuration options (PCO) to the device during the attach procedure based on provisioned information about the requested APN. By contrast, in known procedure the MME retrieves the PCO from the combined gateway during the attach procedure. Because the combined gateway 125 receives no device specific information during the attach procedure, combined gateway 125 is unable to receive network initiated data traffic on this APN except as described below. All devices using the same APN receive the same PCO.

In step S435 the MME 135 provides the base station 110 with the MME 135 provided destination IP addresses for tunneled uplink data packets for each combined gateway 125. For example, each MME 135 may be provided with a one or more destination IP addresses for tunneled uplink data packets for combined gateway 125. Different APNs may share these addresses. The MME 135 may pass this IP address to the base station 110 with each service request from the device. By contrast, in current procedures the combined gateway provides this tunneled uplink data destination IP address to the MME during the attach procedure.

In addition, MMEs and combined gateway 125 are provided with a common APN identifier for each APN, in the form of either a unique ID code, or a unique tunneled uplink data destination User Datagram Protocol (UDP) port number. By contrast, current procedures describe the use of a single well known UDP port number for all tunneled packets. The MME 135 passes this APN identifier to the base station 110 with each service request from the device 105. This information is used below so that the combined gateway 125 may uniquely identify the APN associated with each tunneled uplink data packet.

In step S440 the MME 135 assigns the device 105 a tunnel endpoint ID (TEID). For example, the MME 135 assigns to each device an uplink data TEID that is unique to each device within a given service area of an APN in which the device may remain continuously attached. The service area may be covered by one or more MMEs. As a result, the combined gateway 125 does not store information about uplink data TEID assignment for the device 105 for the duration of the data attachment.

Assignments may be made unique across MMEs by assigning non-overlapping ranges of TEIDs to each MME for assignment. As in current procedures, the MME 135 passes this uplink data TEID to the base station 110 with each service request from the device for use in every uplink tunneled data packet to the combined gateway 125. When moving outside of a given service area, the device may receive a new TEID from a different, overlapping pool of numbers in that area.

Alternatively, the IP address assigned to the device can serve the purpose of the uplink data TEID, making it unnecessary to use the uplink data TEID at all for this type of APN. When using the IP address of the device instead of the uplink data TEID to identify tunneled uplink packets, the TEID attribute in the tunneled header is either deleted or filled with a dummy value. The choice of which alternative to use is a design decision.

In step S442 the MME 135 sends the assignment (e.g., the device 105 TEID) to the base station 110 and the device 105. For example, the MME 135 sends a signaling message to the base station 110 and the device 105. The signaling message may include the assignment.

In step S445 the combined gateway 125 receives first data (received from the device 105 via the base station 110) including additional information (added by the base station 110). When the device has data to send and initiates the device 105 triggered service request procedure, the first tunneled uplink data packets include additional information (e.g., the gateway tunnel identifier, the base station tunnel identifier and the base station IP address) in extension headers (as described above with regard to FIGS. 2 and 3) as needed for the combined gateway 125 to perform the necessary functions for the device.

This type of APN may support only a limited range of functions (e.g., data upload) so only needs a few pieces of information to handle traffic for the device. The additional information provided by the base station 110 may include the base station 110 transport address and TEID (as described above with regard to FIGS. 2 and 3), the APN identifier, a device ID needed for charging functions on the combined gateway 125, and location information as needed for charging.

Other limited information may be required in limited cases and may be included in additional extension headers. The APN identifier may be included in an extension header if the APN identifier is in the form of an APN ID code. Alternately the APN identifier may be included as the destination UDP port of the tunneled packet, depending on the format selected above.

During the service request procedure, the MME 135 may provide any additional information that the base station 110 requires to include in the first uplink data packets (as described above with regard to FIGS. 2 and 3).

As a result, information required to re-establish uplink and downlink data tunnels has been exchanged without requiring the combined gateway 125 to store any device specific state information during periods of time when the device has no active radio bearers.

In step S450 the combined gateway 125 creates address translation bindings. For example, if an access point network (APN) (not shown) associated with the device 105 is an IPv4 APN, and for subsequent uplink data packets from the device 105, the combined gateway 125 creates network address port (NAPT) bindings as necessary to translate the local source address, port and transport protocol combination from the device 105 into an APN-wide address and port combination with the same protocol. The information provided in extension headers in the first tunneled uplink data packets is also stored with the NAPT binding information to support combined gateway 125 functions for the device 105.

More than one binding may be created for the device 105 if the device uses different combinations of port and transport protocols in subsequent uplink packets. The combined gateway 125 may store the bindings for at least as long as the radio bearers are configured to remain active after the last known uplink or downlink data packet for the device and then releases all state information associated with the device.

The combined gateway 125 may forward data packets received from the network towards the device as downlink data only as allowed by the NAPT bindings established during handling of uplink packets. All other network packets received at the combined gateway 125 may discarded. If the combined gateway 125 forwards network packets to the base station 110 after the device radio bearers go inactive, the base station 110 may discard them.

Alternatively, if an access point network (APN) (not shown) associated with the device 105 is an IPv6 APN, and for subsequent uplink data packets from the device 105, the combined gateway 125 creates network address translation (NAT) bindings as necessary to translate the local source address, port and transport protocol combination from the device into an APN-wide address with the same port and protocol.

If the IP address assigned to the device 105 is an IPv4 local address, the combined gateway 125 NAT assigns an "IPv4-mapped IPv6 address" (a global unicast address) to the device 105, as defined in RFC 3513. If the IP address assigned to the device is an IPv6 global unicast address, the combined gateway 125 NAT may assign another IPv6 global unicast address to the device 105 with a new prefix but the same interface ID as the device address. In this case the IP address assigned to the device 105 is globally unique but may not be reachable except via the address assigned by the combined gateway 125 NAT. If the IP address assigned to the device 105 is a site-local unicast IPv6 address or a link-local unicast IPv6 address, the combined gateway 125 NAT assigns an IPv6 global unicast address to the device 105 that has an interface ID of the same length and content as the interface ID of the local address. In all four cases the port and transport protocol remain unchanged across the NAT. The information provided in extension headers in the first uplink data packets (as described above with regard to FIGS. 2 and 3) is also maintained with the NAT binding information to support necessary combined gateway 125 functions for the device 105.

The combined gateway 125 may receive a globally routable IP address for the device from the network control entity. The combined gateway 125 may use the globally routable IP address for the device, the gateway TEID for the device and the gateway destination IP address from the another modified uplink data packet to establish resources in the gateway for an active data session without performing address translation.

In step S455 the base station 110 determines if the radio bearer is inactive. For example, if the radio bearer is inactive, in step S460 the base station 110 sends a dummy uplink data packet to the serving gateway 115. For example, the base station 110 may send a dummy (zero content) tunneled uplink data packet to the combined gateway 125 if the device radio bearers become inactive with an indication that the NAT bindings can be immediately released (without waiting for a NAT binding timer to expire). This reduces the window of time during which undeliverable data packets might be sent to the base station 110. Otherwise processing continues to step S465.

In step S465 the MME 135 determines if the device 105 is outside service area of the MMEs. If the device 105 is outside service area, processing returns to step S420. For example, if the device 105 moves outside of the service area in which the device 105 is attached to the APN, it is forced to re-attach to again access to the APN available in the new service area using procedures already known in the art. Otherwise, processing continues to step S470.

In step S470 the MME 135 determines if the device 105 has detached. If the device 105 is detached, in step S475 the MME 135 return resources. For example, if the device detaches from the Enhanced Packet Core (EPC), the resources allocated by the MME 135 to the device 105 (e.g., IP address and uplink data TEID) may be returned to a common pool.

The resources in the gateway (e.g. NAT binding information, base station identifier and tunnel identifier . . . ) are dynamically allocated at the start of the uplink data transfer and maintained as long data traffic is exchanged. These resources are maintained for a defined period of time when no more data traffic is exchanged. The defined period of time may be variable (e.g., set for each bearer allocation) or fixed (e.g., a variable stored in, for example, a data base). The defined period of time may be a design time choice and will typically cover the duration during which the base station maintains the radio bearers upon user inactivity after data transfer. When the defined period of time has expired, the resources allocated dynamically in the gateway at the start of the data transfer to the device 105 may be returned to a common pool. The defined period of time may be associated with an inactivity period. After the inactivity period after the data transfer, the combined gateway 125 may release the context and related binding, again without any signalling/control by the MME 135.

The above example embodiment with regard to FIG. 4 gives examples using an IPv4 NAT APN and an IPv6 NAT APN. According to example embodiments, a difference between the IPv6 NAT APN and the IPv4 NAT APN is that the combined gateway 125 may optionally arrange to deliver data packets to the device even after the NAT binding information is released, so long as the service area defined for the APN is limited to the service area of a single MME. Note that this option is not available for the IPv4 NAT APN because multiple devices may be assigned the same IP address. Therefore, if the NAT binding disappears there may be no way to uniquely identify an intended recipient device for an incoming network packet.

To apply the option if the address assigned to the device is an IPv6 global unicast address, the NAT may use a prefix translation procedure that allows the NAT to reconstruct the prefix assigned to the device 105 from the prefix used to deliver the packet to the combined gateway 125 (the reverse of the NAT translation). The other three IPv6 NAT APN address forms may support a unique mapping to the device IP address.

If the option is selected to attempt delivery of network data after expiration of the binding data, the combined gateway 125 may send a downlink data notification message to the MME 135 associated with the service area of the IPv6 global address prefix, after mapping the destination address of the incoming network packet to a device address in the form chosen for the APN (either an IPv4 local address, IPv6 global unicast address, a site-local unicast IPv6 address, or a link-local unicast IPv6 address), reversing the procedure used to compute the NAT address from the device address, and including the mapped address in the downlink data notification message.

This downlink data notification message may differ from the standard notification message in that the device 105 may be identified with an assigned IPv4 or IPv6 address rather than via signaling in an existing Packet Data Network (PDN) connection, as in known procedures. No PDN connection is maintained between the MME 135 and combined gateway 125 with either the IPv4 NAT APN or the IPv6 NAT APN since the combined gateway 125 does not maintain any device specific state information. Once the downlink data notification arrives at the MME 135, the MME 135 identifies the device 105 that is assigned the mapped address and follows the existing procedure for paging the device to receive downlink data.

The example embodiment according to the method described in FIG. 4 may reduce the number of network messages needed when a device re-activates a bearer using the service request procedure, thus reducing the associated processor load on the MME 135 and the combined gateway 125. Example embodiments reduce the number of messages required in the "UE triggered service request" procedure described in clause 5.3.2.1 of 3GPP TS 23.401. For example, the determinations of steps S405, 410 and 415 allow example embodiments to remove messages 7, 10, 12, 16, 23 and 24 from the procedure in figure 5.3.2.1-1 of 3GPP TS 23.401 and add the information missing from these messages to the first uplink data packets.

The example embodiment according to the method described in FIG. 4 may reduce the number of network messages needed when a device re-activates a bearer using the service request procedure, thus reducing the associated processor load on the MME 135 and the combined gateway 125. Example embodiments reduce the number of messages required in the "UE triggered service request" procedure described in clause 5.3.4.1 of 3GPP TS 23.401. For example, the determinations of steps S405, 410 and 415 allow example embodiments to modify messages 4 and 6 from the procedure in figure 5.3.4.1-1 of 3GPP TS 23.401 and add the information missing from these messages to the first uplink data packets.

In example embodiments, create session request and response messages, the delete session request and response messages, and the modify bearer request and response messages may be removed (in the known procedures described in 3GPP TS 23.401) from the associated Attach, tracking/routing area update, handover and detach procedures that are relevant to the APNs. A dummy uplink data message is added to the handover procedures in place of the modify bearer request and response, as described above under the first major aspect of the solution. During the detach procedure, the MME 135 may release resources assigned to the device, including its IP address and uplink data TEID.

Figure 5:
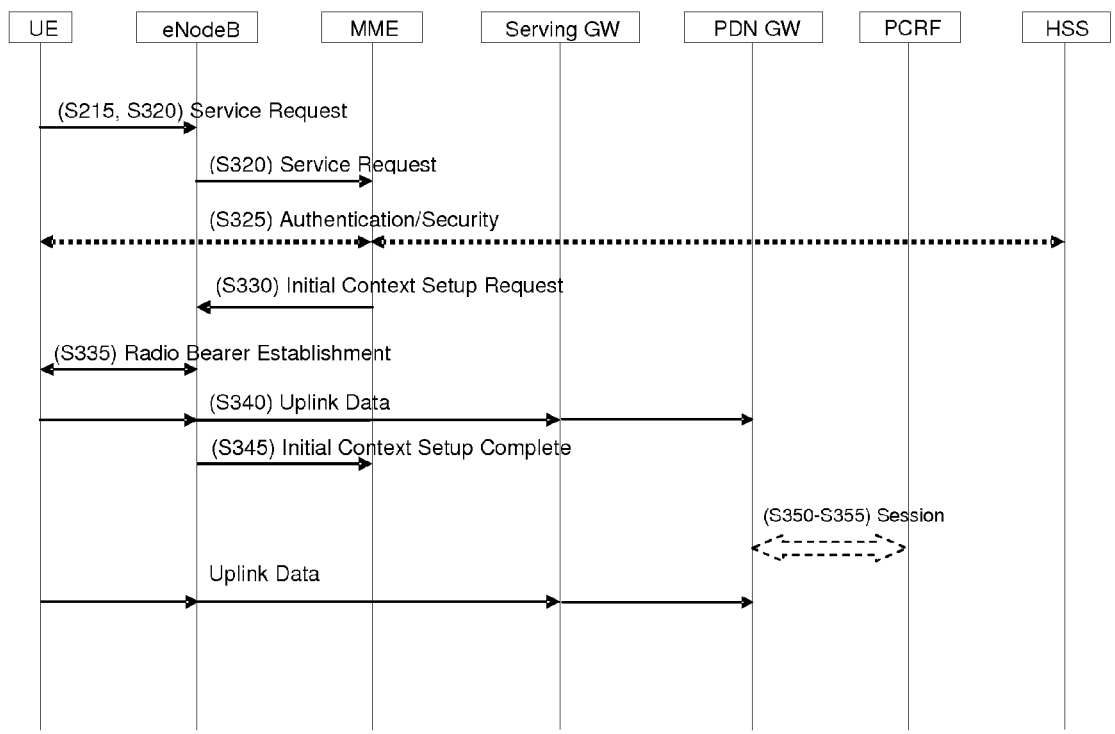
FIG. 5 is a signal flow diagram for bearer activation in the core network for wireless devices according to an example embodiment.

FIG. 5 is a signal flow diagram illustrating bearer activation in the core network for wireless devices according to an example embodiment. The final uplink data signal flow is data flows (without modified packet header) after the bearers are activated. The other signal and data flows shown in FIG. 5 are designated with the steps described above with regard to FIGS. 2-4. These steps will not be described further for the sake of brevity.

Although the above discussion of the example embodiments is with respect to an E-UTRAN (LTE) system including a MME as a network control entity. However, one skilled in the art will recognize the example embodiments also apply to an UTRAN system including a Serving General Packet Radio Service (GPRS) Support Node (SGSN) as a network control entity.

While example embodiments have been particularly shown and described, it will be understood by one of ordinary skill in the art that variations in form and detail may be made therein without departing from the spirit and scope of the claims.

We claim:

1. A system comprising:
a base station including a memory and at least one processor associated with the memory, the memory having computer readable instructions stored thereon, and the at least one processor configured to execute the computer readable instructions to,
receive a service request message from a first device,
store a gateway tunnel identifier, a base station identifier and a base station tunnel identifier to the memory,
establish a radio bearer between the base station and the first device in response to the service request message,
receive one or more first uplink data packets from the first device using the radio bearer,
modify the one or more first uplink data packets such that the one or more first uplink data packets include the gateway tunnel identifier, the base station identifier and the base station tunnel identifier, and
send the modified one or more first uplink data packets to a gateway, the modified one or more first uplink data packets for use by the gateway to activate a bearer without an exchange of any message regarding the bearer between the gateway and a mobility management entity or between the gateway and a serving gateway support node.

2. The system of claim 1, wherein
the gateway is configured to use the gateway tunnel identifier, the base station identifier and the base station tunnel identifier from the modified one or more first uplink data packets to activate the bearer without exchanging the any message with the mobility management entity or the serving gateway support node, and
the any message is a bearer re-activation message for re-activating the bearer in the gateway.

3. The system of claim 2, wherein the gateway does not receive a Modify Bearer Request message from the mobility management entity or the serving gateway support node and does not send a Modify Bearer Response message to the mobility management entity or the serving gateway support node.

4. The system claim 2, wherein the at least one processor is further configured to execute the computer readable instructions to,
receive an acknowledgement that the gateway re-activated the bearer successfully,
receive one or more second uplink data packets from the first device, and
forward the one or more second uplink data packets to the gateway without modifying the one or more second uplink data packets.

5. The system of claim 1, wherein the at least one processor is further configured to execute the computer readable instructions to,
receive the gateway tunnel identifier and a gateway destination address if the mobility management entity or the serving gateway support node determines whether an access point network (APN) designating the packet data network to which the first device requests to be connected is accessible from a visited network, the first device requires at least one of a group including best effort data transport and static priority data transport, and the first device registers to only one APN at a time.

6. The system of claim 1, wherein the at least one processor is further configured to execute the computer readable instructions to,
receive downlink data from the gateway, the downlink data indicating the receipt of the one or more first uplink data packets and that the gateway has received and stored the base station identifier and the base station tunnel identifier.

7. The system of claim 6, wherein the at least one processor is further configured to execute the computer readable instructions to,
send a setup complete message to the mobility management entity or the serving gateway support node acknowledging a successful re-activation of the bearer in the gateway.

8. The system of claim 1, wherein the at least one processor is further configured to execute the computer readable instructions to,
send one or more dummy uplink data packets to the gateway until a downlink data packet is received by the base station, the one or more dummy tunneled uplink data packets including the gateway tunnel identifier, the base station identifier and the base station tunnel identifier.

9. The system of claim 1, wherein the at least one processor is further configured to execute the computer readable instructions to,
receive a second message from the mobility management entity or the serving gateway support node, the second message including a gateway tunnel endpoint ID (TEID) for the first device, a gateway destination IP address and an access point network (APN) identifier,
receive one or more second uplink data packets from the first device, the one or more second uplink data packets including a source IP address, the source IP address being an address for the first device, and
send modified one or more second uplink data packets to the gateway, the one or more second modified uplink data packets including the gateway TEID for the first device, the gateway destination IP address and the APN identifier.

10. The system of claim 9, wherein the gateway uses the address for the first device, the gateway TEID for the first device and the gateway destination IP address and the APN identifier from the modified one or more second uplink data packets to establish address translation bindings in order to allocate an address translated IP address for a data session associated with a requested APN.

11. The system of claim 10, wherein each of the address for the first device and the address translated IP address is one of a group including an IPv4 address and an IPv6 IP address.

12. The system of claim 9, wherein the gateway is configured to,
receive a globally routable IP address for the first device previously allocated to the first device by the mobility management entity or the serving gateway support node, and
use the globally routable IP address for the first device, the gateway TEID for the first device and the gateway destination IP address from the modified one or more second uplink data packets to establish resources in the gateway for a data session without performing address translation.

13. The system of claim 1, wherein the at least one processor is further configured to execute the computer readable instructions to, determine that the base station is a target base station for a second device in a handover procedure, and send one or more dummy uplink data packets to the gateway until a downlink data packet is received by the base station, the one or more dummy tunneled uplink data packets including the gateway tunnel identifier, the base station identifier and the base station tunnel identifier.

14. A gateway comprising:

a memory having computer readable instructions stored thereon; and at least one processor, the processor configured to execute the computer readable instructions to, receive a first uplink data packet including a tunnel identifier and a base station identifier, and activate a bearer using the tunnel identifier and the base station identifier without an exchange of any message regarding the bearer between the gateway and a mobility management entity or between the gateway and a serving gateway support node.

15. The gateway of claim 14, wherein the any message is at least one of a group including a message to re-activate the bearer in the gateway and a Modify Bearer Request message from the mobility management entity or the serving gateway support node, and the gateway does not send a Modify Bearer Response message to the mobility management entity or the serving gateway support node to activate the bearer using the tunnel identifier and the base station identifier.

16. The gateway of claim 14, wherein the at least one processor is further configured to execute the computer readable instructions to, send downlink data to the base station, the downlink data indicating receipt of the first uplink data packet and that the gateway has received and stored in the memory the base station identifier and tunnel identifier.

17. The gateway of claim 14, wherein the at least one processor is further configured to execute the computer readable instructions to, receive a second uplink data packet including an address for a device, a gateway tunnel endpoint ID (TEID) for the device and a gateway destination IP address, use the address for the device, the gateway TEID for the device and the gateway destination IP address from the second uplink data packet and an address translation binding created upon receipt of the first uplink packet to perform address translation, and release resources allocated for a data session after an inactivity period without signalling interaction with the mobility management entity or the serving gateway support node.

18. The gateway of claim 14, wherein the at least one processor is further configured to execute the computer readable instructions to, determine if binding data associated with a device have expired, determine if the device is selected for delivery of network data after expiration of the binding data, map a destination address of an incoming network packet to a device address, and send a downlink data notification message to the mobility management entity or the serving gateway support node if the device is selected for attempting delivery of network data after expiration of the binding data, the downlink data notification message including the destination address.

19. The gateway of claim 17, wherein the gateway uses the address for the device, the gateway TEID for the device and the gateway destination IP address and an access point network (APN) identifier from a modified first uplink data packet or a modified second uplink data packet to establish address translation bindings in order to allocate an address translated IP address for the data session associated with the APN identified by the APN identifier.

20. The gateway of claim 19, wherein each of the address for the device and the address translated IP address is one of a group including an IPv4 address and an IPv6 IP address.

21. The gateway of claim 14, wherein the at least one processor is further configured to execute the computer readable instructions to, receive a globally routable IP address for a device previously allocated to the device by the mobility management entity or the serving gateway support node, and the gateway is configured to use the globally routable IP address for the device, the gateway TEID for the device and the gateway destination IP address from modified first uplink data packet to establish resources in the gateway for the data session without performing address translation.

* * * * *